March 15, 1927.
A. K. SIMMONS
1,621,175
DENTAL FASTENING MEANS
Original Filed Aug. 24, 1922
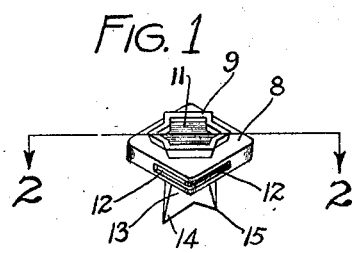
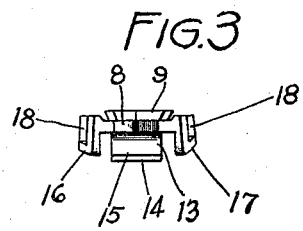
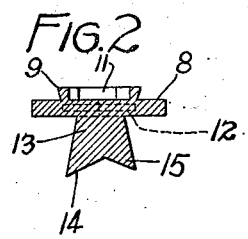
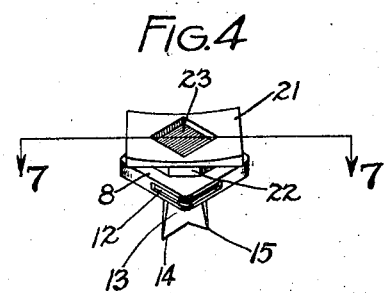
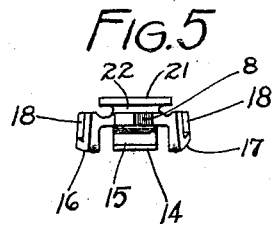
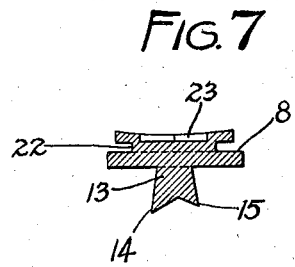
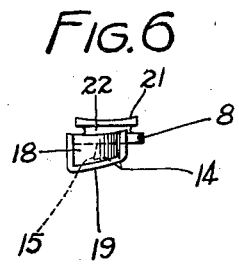
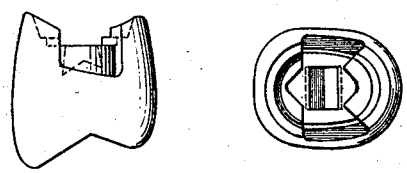
Inventor
ALFRED K. SIMMONS
By Paul, Paul + Moore
ATTORNEYS Patented Mar. 15, 1927.

1,621,175

UNITED STATES PATENT OFFICE.

ALFRED K. SIMMONS, OF FARIBAULT, MINNESOTA.

DENTAL FASTENING MEANS.

Original application filed August 24, 1922, Serial No. 584,115. Patent No. 1,589,994, dated June 22, 1926. Divided and this application filed January 21, 1924. Serial No. 687,601.

This invention relates to fastening means for securing artificial teeth, crowns or similar articles, to dental plates or dentures of the various types now in common use and well-known in the dental profession and to those skilled in this art. Such plates are frequently of metal alloys or of a composition known as vulcanite.

The subject-matter of this application is disclosed in applicant's prior co-pending application, Serial Number 584,115, filed August 24, 1922, and is divisional thereof.

When securing artificial teeth, crowns, dental bridge work, etc., to these dental plates or bridge sections, it is necessary to affix the teeth, etc., to the plates, crowns and bridges, etc., in such manner that the teeth are not liable to longitudinal or lateral displacement nor to rotative tendencies. The disadvantages of such displacements are obvious to those skilled in this art. This novel fastening means is adapted to be embedded within the plate with a portion projecting therefrom for attachment to the artificial tooth or crown. The base of the fastening means preferably has an angular periphery to resist rotative tendencies and has a somewhat irregularly shaped projection inwardly extending from what may be termed the inner face of the base. The tooth-securing means projects outwardly from what may be termed the outer face of the base portion. It is this tooth-securing means, here shown for example as an abutment, which projects from the surface of the dental plate within which the fastening means may be operatively embedded. The tooth is adapted to be secured to such abutment as by means of the usual dental cement.

The object therefore of this invention is to provide an improved fastening means for use with artificial dentures, crowns, dental bridges, etc.

Other objects of the invention will more fully appear from the following description and the accompanying drawings and will be pointed out in the annexed claims.

In the drawings, there has been disclosed a structure designed to carry out the objects of the invention, but it is to be understood that the invention is not confined to the exact features shown, as various changes may be made within the scope of the claims which follow.

In the drawings:

Figure 1 is a perspective view of the fastening means;

Figure 2 is a vertical sectional view on the line 2—2 of Figure 1;

Figure 3 is a view in front elevation of the fastening means shown in Figure 1 but with the peripheral base-groove omitted and with the addition of laterally depending wings;

Figure 4 is a perspective view of a slightly modified form of inner projection;

Figure 5 is a view in front elevation of the form shown in Figure 4, but with the peripheral base-groove omitted and with the addition of laterally depending wings;

Figure 6 is a view in side elevation of the form shown in Figure 5;

Figure 7 is a vertical section on the line 7—7 of Figure 4;

Figure 8 is a view in side elevation of a novel tooth adapted for use with the novel fastening means; and Figure 9 is a plan view thereof.

It is broadly old in this art to secure artificial teeth or similar bodies to dental plates, bridges, etc., and the invention herein resides in the provision of an improved fastening means adapted to be cast, vulcanized or otherwise, embedded in the plate either with the tooth secured thereto or so that the tooth may be conveniently secured thereto or replaced after emplacement of the fastening means.

The form shown in Figures 1 and 2 is one more particularly adapted for use with metallic plates while the form shown in Figures 4, 5 and 6 is more particularly adapted for use with the rubber composition plates or the well-known vulcanite plates. This novel fastening means in the form shown in Figures 1 and 2 is of metal and consists of a base 8 which is preferably of a form other than circular so that, when it is embedded in a tooth, rotative tendencies will be overcome. Its form here shown is an angular one, substantially a square having slightly rounded corners, and for convenience of reference, the two opposed faces of the base may be referred to as the inner and outer, the inner face being the one which is adjacent the surface of the dental plate when this fastening device is in its embedded working position.

The base is preferably provided with means projecting from its inner face which thus extends into the material of the dental plate. This inwardly projecting member is shown in Figures 1 and 2 as formed by an integral upstanding rib 9 which presents a recess 11. This rib is preferably shaped to provide a plurality of angles whereby, when the fastening means is affixed to a dental plate, the material of the plate will extend within the recess 11 and will surround the irregular continuous rib 9 and effect a retentive holding of the fastening means to the plate. The periphery of the base 8 may be recessed, as is shown in Figure 1, wherein the adjacent portions of two adjoining peripheral faces of the base are provided with communicating grooves 12. The grooves are useful in crown and bridge-work wherein the inner projecting portion formed by the ribs 9 is embedded in the metal of the crown or bridge and additional metal is cast to provide depending wing-like members upon the distal and mesial portions of the fastening means. Such wing-like members are adapted to be seated within suitable recesses provided in the tooth to be fastened. By the employment of these grooves 12, a portion of the additional casting metal enters within the grooves and assures retentive securing of the cast wings or depending members.

The outer face of the base has a means projecting therefrom which is adapted to have an artificial tooth or crown secured thereto so that, when the base is secured to a dental plate with the outer tooth-securing means extending exteriorly thereof, the tooth or crown may be secured to the fastening-means even if the latter is in its operative position. This outer projecting means is shown as a lug or abutment 13. The outer face of this abutment 13 is re-entrantly V-shaped to form the two terminals 14 and 15, the former extending farther from the base than the latter. The lateral faces of the abutment are outwardly divergent so that the abutment is thicker at its outward end than it is at its base.

A modification of the base of this novel fastening-means is shown in Figure 3, wherein the depending wings 16 and 17 are added to the base on either side of the abutment. The abutment is adapted to be received within a recess formed in the tooth or crown which is to be secured to the dental plates by means of this fastening device. The abutment is usually held within the toothed recess by means of any common form of dental cement. When the wing type is used, the opposed faces of the tooth or crown are suitably recessed, as is shown in Figures 8 and 9, to receive these wings which are likewise cemented in position. The V-shaped outer face of the abutment with its spaced terminals tends to prevent any fore or aft rocking of the affixed tooth while the wings prevent any lateral rocking tendencies between the tooth and its fastening-means.

The form shown in Figures 4 and 7 is more particularly adapted for use with the rubber composition or so-called vulcanite dental plates. In this form, the member which projects from the inner face consists of an integral plate 21 which is spaced from the base 8 by means of a short integral neck 22 so that this plate 21 overhangs the major portion of the base. The inner face of this plate is generally concave and is preferably provided with a central recess 23 for a purpose similar to that of the recess 11 of the previously mentioned metal plate form. This form, similar to the other form, is preferably made of one of the precious or semi-precious metals or alloys used in dental art. This modified form may likewise be provided with the angular peripheral grooves 12 and with the depending wings 16 and 17 as shown in Figures 5 and 6. The abutment employed is like that shown in Figure 1 and has the same function.

Having thus described my invention what I claim as new and desire to secure by Letters-Patent, is:

1. In a dental fastening means, the combination of a base having an angular periphery, an abutment projecting from the outer face of the base and adapted to have an artificial tooth or crown secured thereto, said base being adapted to be embedded in a denture, crown or bridge with the abutment extending exteriorly thereof whereby said tooth or crown may be secured to the positioned base, the periphery of the base being recessed adjacent its angle so that when the base is embedded in a plastic material of a denture, crown or bridge, the material will extend into said angular recesses and, upon hardening, will assist in preventing relative movement of the base.

2. In a dental fastening means, the combination of a base having an angular periphery to prevent axial rotation of the base when embedded in a denture, crown or bridge, an elongated rib projecting inwardly from the inner face of the base, said rib being angularly shaped to aid in preventing axial rotation of the base, and tooth-securing means extending from the outer face of the base.

3. In a dental fastening means, the combination of a base having an angular periphery to prevent axial rotation of the base when embedded in a denture, crown or bridge, an elongated projection inwardly extending from the inner face of the base, said projection being angularly shaped to aid in preventing axial rotation of the base and a plurality of the angles of the base periphery and of said projection being offset, and tooth-securing means extending from the outer face of the base.

In witness whereof, I have hereunto set my hand this 4th day of January 1924.

ALFRED K. SIMMONS.